Jan. 13, 1970                    C. E. QUINBY                    3,489,016
NONDISTORTING COMPONENT RETAINING STRUCTURE
Filed March 8, 1967

INVENTOR.
CHARLES E. QUINBY
BY
*N. Schmidt*
ATTORNEY

United States Patent Office 3,489,016
Patented Jan. 13, 1970

3,489,016
NONDISTORTING COMPONENT RETAINING
STRUCTURE
Charles E. Quinby, Grand Rapids, Mich., assignor to
Lear Siegler, Inc.
Filed Mar. 8, 1967, Ser. No. 621,588
Int. Cl. G01c 19/04
U.S. Cl. 74—5                                               7 Claims

ABSTRACT OF THE DISCLOSURE

A bearing plate is added to a conventional pillow-block bearing structure on the opposite side of the pedestal from the cap. The cap securing screws are threaded into the bearing plate rather than the pedestal. A load relocator such as a non-deformable ball, cylinder, cone or the like is positioned between the bearing plate and the bottom of the pedestal such that the force component exerted against the pedestal by the retained shaft, bearing or the like is coincident with the opposite force component exerted on the pedestal by the load relocator. This construction prevents undesirable distortion of the pedestal section and, thus, any operative component to which it may be attached or form an integral part of. The invention has been found particularly useful for securing the spin axis shaft within the inner gimbal of a gyroscope assembly to prevent distortion of the trunnion axis.

BACKGROUND

In the assembly of many varying types of mechanical structures, it is necessary to affix a shaft, bearing or like member to another working component. Thus, for example, in the assembly of a gyroscope, it is necessary to secure the spin axis shaft between opposite sides of the inner gimbal in rigid fashion such that gyro torques resulting from spatial position changes of the gyroscope housing will be transmited without error to the gimbal structure.

It has been customary in the past to affix components of this type toegther by means of pillow blocks affixed directly to the operative component or pedestal. The shaft, bearing or like member is sandwiched between the pillow-block cap and the pedestal and the cap is pulled toward the pedestal by means of screws or the like. Thus, in the assembly of a gyroscope, the spin axis shaft is rigidly affixed to the inner gimbal by means of two caps, each cap being affired to the gimbal at opposite end portions of the longitudinal axis of the shaft.

The pillow-block mode of component assembly has proved generally satisfactory for most uses. Problems have been encountered, however, whenever the so-called pedestal and the operative component to which it is affixed, or forms an integral part of, are operationally degraded by subjection to the force moments inherently resulting from such an attachment. Thus, again referring to the typical gyroscope assembly, the spin axis shaft will be affiixed to the inner gimbal such that it is perpendicular with respect to the trunnion axis of the gimbal. As will be discussed in more detail, the affixing of the shaft to the gimbal by means of conventional pillow blocks often results in a distortion of the trunnion axis of the gimbal to such an extent that the operational characteristics of the gyroscope so assembled are markedly degraded.

OBJECTS AND SPECIFICATION

It is an object of this invention, therefore, to provide a non-distorting pillow-block assembly suitable for utilization in environments such as those noted above wherein slight distortions in the pedestal and attached or integral component cause a degradation in the operational characteristics of the apparatus thus assembled.

More particularly, it is an object of this invention to provide a novel pillow-block assembly wherein the pedestal is not subject to undesirable bending moments caused by the cap attachment screws.

It is yet another object of his invention to provide a device of the type described particularly adapted for utilization in the assembly of a gyroscope, the novel pillow-block structure eliminating undesirable distortion of the gimbals and the like during component assembly and, thus, providing a more accurate instrument.

These as well as other objects of this invention will be readily understood by those skilled in the art with reference to the following specification and accompanying figures in which.

Briefly, this invention comprises a non-distorting pillow-block assembly for retaining a bearing, shaft or like member is fixed relationship with respect to a pedestal having a cap member adapted to be positioned over the bearing, shaft or the like and force it into abutment with the pedestal. A bearing plate is positioned on the opposite side of the pedestal from the cap member and means are provided for drawing the cap toward the bearing plate and, thus, toward the pedestal to sandwich the bearing, shaft or the like therebetween. Means are positioned between the pedestal and the bearing plate for establishing a restricted area of force transmitting contact therebetween. The area so established is generally aligned with the force component exerted on the pedestal by the cap through the shaft, bearing or like member in such a manner that the load forces exerted on the pedestal by the entire pillow-block assembly are generally coincidental.

Referring now to the figure, a preferred embodiment of this invention will be described in detail. While the preferred embodiment will be described with continued reference to a gyroscopic environment, it will be readily appreciated by those skilled in the art that the instant invention will find utility in many other fields, both related and unrelated, where similar problems have been and continue to be presented.

Figure 1:
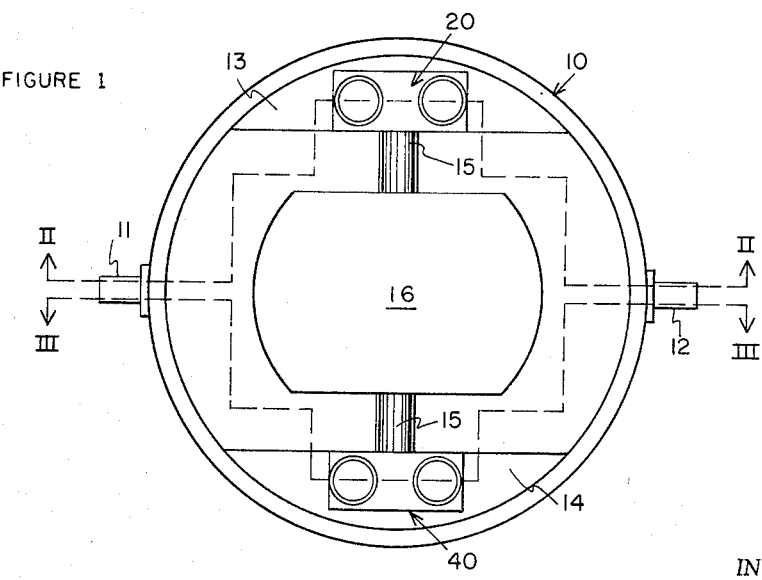
FIG. 1 is a schematic plan of a typical inner gimbal and gyro structure for a gyroscope assembly.

FIG. 1 illustrates an inner gimbal 10 of a gyroscope assembly. The gimbal 10 has conventional trunnions 11 and 12 wherefrom it is rotatably supported from the next outward gimbal. The gimbal consists of a structural shape, in this case a ring, having a pair of pedestal sections 13 and 14 integrally formed therewith. The pedestal sections 13 and 14 are disposed at right angles with respect to the trunnion axis of the gimbal.

Suspended between the pedestal sections 13 and 14 of the gimbal 10 is a spin axis shaft 15. A gyro 16, which forms no part of this invention, is mounted on a spin axis shaft 15 for rotation thereabout. The spin axis shaft 15 will be described as being affixed to the pedestal section 13 by means of a conventional pillow-block assembly (for purposes of illustration only) and to the pedestal section 14 by means of a novel pillow-block assembly 40 which is the subject of this invention.

Figure 2:
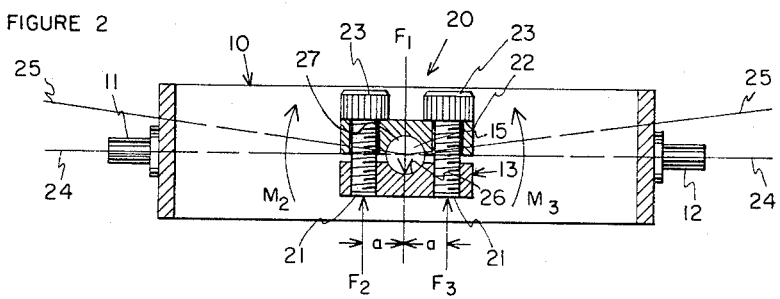
FIG. 2 is a cross section taken along line II—II of FIG. 1 illustrating the now conventional mode of affixing the spin axis shaft to the gimbal pedestal section.

Referring now additionally to FIG. 2, there is illustrated a conventional pillow-block assembly 20 which comprises a pair of tapped apertures 21 in the gimbal pedestal section 13 disposed on either side of a pedestal shaft-receiving concave 26. A cap member 22, having a downwardly facing concave 27, is placed over the shaft 15 and a pair of clamping screws 23 are protruded therethrough on either side of the concave 27, and threaded into the tapped apertures 21 in the gimbal pedestal section 13. The screws 23 are tightened to compress the shaft 15 between the cap 22 and the pedestal 13 until the necessary degree of rigidity is obtained. The cap 22 must be spaced from the pedestal section 13 to insure proper rigidity of the connection.

It will be noted from an examination of FIG. 2 that the downward force indicated by a vector $F_1$ bears against the gimbal pedestal section 13 at the center of concave 26. The upward force, however, is applied at the two locations indicated by the vectors $F_2$ and $F_3$ due to the position of the clamping screws 23. Thus, each of the vectors $F_2$ and $F_3$ are horizontally separated from the downward vector $F_1$ by a distance $a$ which results in the creation of torsional moments $M_2$ and $M_3$ on the gimbal 10 about the shaft 15. Since the moments $M_2$ and $M_3$ are oppositely directed, a marked tendency exists for the trunnion axis 24 of the gimbal 10 to be distorted toward the configuration indicated by the reference numeral 25 during tightening of the clamping screws 23, and of course, thereafter. This distortion of the trunnion axis 24 is a direct product of the inherent clamping characteristics of the conventional pillow-block assembly 20.

Concededly, in the vast majority of pillow-block usages, the rather slight distortion resulting from the moments $M_2$ and $M_3$ of the pedestal connected component are of no importance. In those situations, however, where the pedestal sections or the gimbal itself are fabricated from relatively light material or where it is imperative for the particular operating environment that the original configuration be maintained absolutely, the conventional pillow-block assembly as illustrated in FIG. 2 is unsatisfactory because of these inherent moment-generating properties. For example, in the gyroscope gimbal 10 illustrated in FIG. 2, the slight distortion of the trunnion axis results directly in a misalignment of the trunnions with their receiving bearings in the next outer gimbal causing non-uniform frictional constants within the rotatable joint at each end of the gimbal. Such misalignment, as will be readily appreciated by those skilled in the gyroscope art, markedly degrades the accuracy of the system so constructed.

Figure 3:
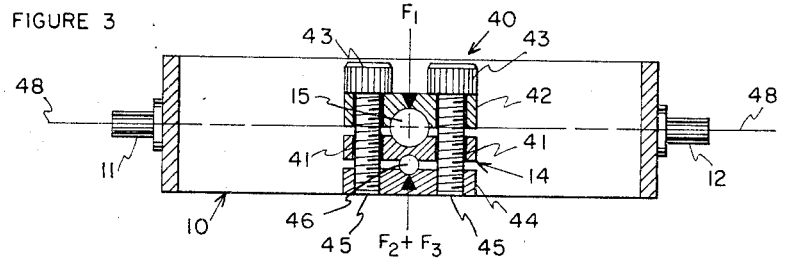
FIG. 3 is a cross section taken along line III—III of FIG. 1 illustrating the novel mode of attaching the spin axis shaft to the gimbal pedestal section.

It has been found that the moment-generating tendencies of the relatively inexpensive pillow-block assembly illustrated in FIG. 2 can be completely eliminated by the utilization of structural components such as those shown in FIG. 3. In this particular case, the apertures 41 in gimbal pedestal 14 are not tapped but, rather, the clamping screws 43 are allowed to pass freely through both the cap 42 and the apertures 41. The screws then engage a bearing plate, indicated generally by the reference numeral 44, having a pair of tapped apertures 45 therein. Positioned between the bearing plate 44 and the gimbal pedestal section 14 is a load relocator 46 which conveniently may comprise as illustrated, a conventional metallic ball such as is found in a ball bearing.

Figure 4:
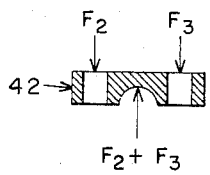
FIG. 4 is a cross section of the pillow-block cap.
Figure 5:
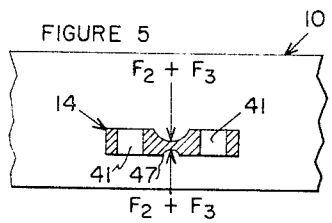
FIG. 5 is a fragmentary, cross section of the gimbal and integrally formed pedestal section.
Figure 6:
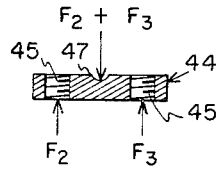
FIG. 6 is a cross section of the bearing plate.

Referring now additionally to FIGS. 4 through 6, as the clamping screws 43 are tightened in the structural configuration shown in FIG. 3, no tension or compression forces are transmitted into the pedestal section 14 at the apertures 41 thereof. Rather, the compressive forces indicated by the vectors $F_2$ and $F_3$, of the clamping screws 43 are transferred to the upper side of the pedestal 14 by the shaft 15 and an equal, coincident force is transmitted in converging fashion to the lower side of the pedestal 14 by the load relocator member 46. Thus, no moments whatsoever are imposed upon pedestal section 14 and its attached or integrally formed operative component since no moment arms are provided. The salutary features of the elimination of such moment arms will be apparent readily from the preceding discussion of FIG. 2.

In the preferred embodiment illustrated, the load relocator 46 comprises a spherical, non-deformable member which conveniently may be retained in position by means of a pair of facing concaves or indents 47 in facing surfaces of the bearing plate 44 and the pedestal 14. It will be readily apparent to those skilled in the art, however, that any number of geometric configurations might be utilized with equal success. Functionally, all that is required is that the load relocator 46 renders the opposing forces acting upon pedestal 14 coincident. Thus, for example, a cylinder having its axis parallel to the axis of the shaft 15 and positioned directly therebelow, when viewed in the positions shown in FIGS. 2 and 3, would perform precisely the same function as the illustrated sphere. Similarly, a conical configuration might be utilized. In fact, any type of physical configuration which transmits the upwardly directed force, as viewed in FIG. 3, to the pedestal coincident with the downwardly directed force on the pedestal will form a satisfactory load relocator.

It will also be readily apparent to those skilled in the art that while the bearing plate 44 is illustrated as a separate component having exterior dimensions approximately equal to the cap 42, it might take any of a myriad of possible configurations and might even, for example, be integrally connected to the pedestal 14 by means such as a compression bearing web located directly beneath the axis of the shaft 15 when the assembly is viewed from the position indicated in FIG. 3.

In the embodiment of the invention illustrated, the pillow-block assembly has been utilized to clamp a shaft in stationary fashion to the pedestal. The teachings set forth in this disclosure, however, would apply equally to the retention of a bearing within which a shaft was rotatably journaled. Regardless of the particular component positioned between the cap and the pedestal, torsional moments may be avoided by utilizing the novel pillow-block assembly.

While a preferred embodiment of this invention has been illustrated in detail, it will be readily apparent to those skilled in the art that numerous other embodiments may be conceived and fabricated without departing from the spirit of this specification and the accompanying drawings. Such other embodiments are to be deemed as included within the scope of the following claims unless these claims, by their language, expressly state otherwise.

What is claimed is:

1. A nondistorting pillow-block assembly for retaining a member, including:
   a pedestal for supporting said member;
   a cap positioned over said member in spaced relation to said pedestal;
   a bearing plate, positioned in spaced relation to the opposite side of said pedstal from said cap, cooperable with said cap to force said member into abutment with said pedestal and effect equal opposing forces on opposite sides of said pedestal; and
   means positioned between said pedestal and said bearing plate for effecting general coincidence between said opposing forces.

2. The invention as recited in claim 1, further including means for drawing said cap toward said bearing plate and, thus, toward said pedestal.

3. The structure as set forth in claim 2 wherein said drawing means comprises a pair of clamping screws positioned on either side of said member, each of said screws passing freely through said pedestal and being threadably attached to one of said cap members and said bearing plate.

4. The structure as set forth in claim 1 wherein said coincidence effecting means comprises a non-deformable sphere positioned between said pedestal and said bearing plate.

5. The structure as set forth in claim 4 wherein said sphere is retained in position by means of facing indents in said bearing plate and said pedestal into which opposite segments of said sphere are adapted to seat.

6. The structure as set forth in claim 2 wherein said cap member and the facing surface of said pedestal are adapted to receive segments of said members to prevent its movement therebetween after tightening of said drawing means.

7. In a gyroscope assembly having a gimbal with pedestal sections affixed to opposite sides thereof and a span axis shaft rigidly clamped between said sections, the improvement comprising:
- cap members adapted to be positioned over the extremities of said shaft and forced into abutment with said pedestal sections;
- bearing plates adapted to be positioned on the opposite sides of said pedestal sections from said cap members;
- means for drawing each said cap member toward its associated bearing plate to rigidly sandwich each of said shaft extremities between one of said caps and its associated pedestal section; and
- means positioned between each said pedestal section and the adjacent bearing plate for establishing a restricted area of force transmitting contact therebetween such that load forces exerted on opposite side of said pedestal are generally coincident.

References Cited
UNITED STATES PATENTS

| | | | |
|---|---|---|---|
| 304,512 | 9/1884 | Elliott | 308—65 |
| 1,360,787 | 11/1920 | Pennoyer | 308—65 |
| 1,444,628 | 2/1923 | Miller | 308—63 |
| 2,865,205 | 12/1958 | Lear et al. | 74—5 |

FRED C. MATTERN, Jr., Primary Examiner

MANUEL ANTONAKAS, Assistant Examiner

U.S. Cl. X.R.

308—63